Figure 1:
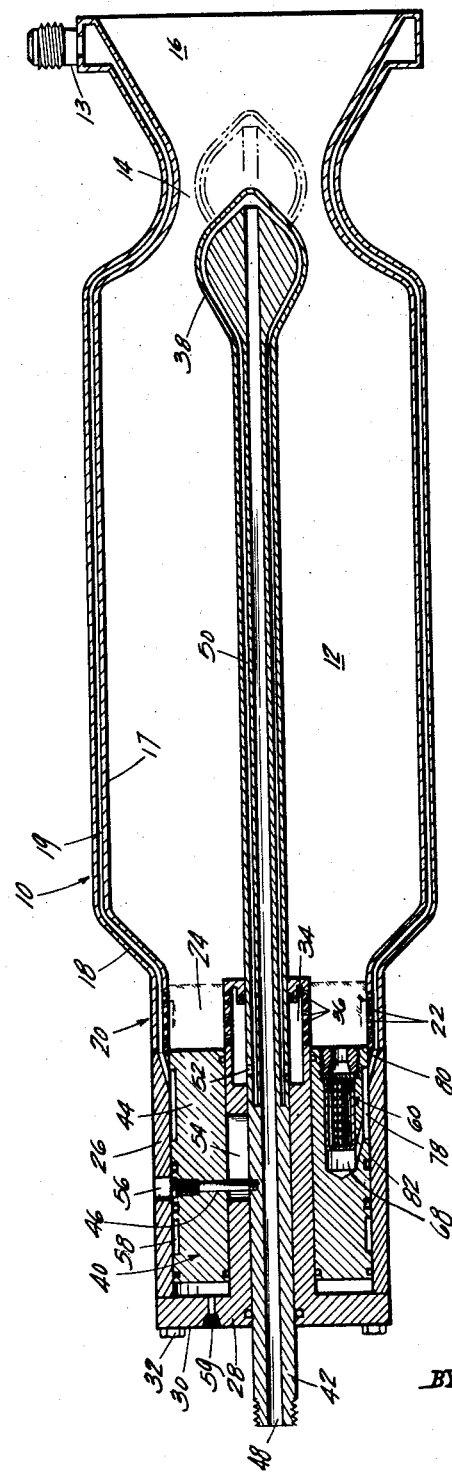

Sept. 29, 1964     F. R. HICKERSON     3,150,485
VARIABLE THRUST ROCKET ENGINE

Filed Nov. 24, 1961     2 Sheets-Sheet 1

INVENTOR.
FREDERICK R. HICKERSON
BY
ATTORNEY

Sept. 29, 1964  F. R. HICKERSON  3,150,485
VARIABLE THRUST ROCKET ENGINE

Filed Nov. 24, 1961  2 Sheets-Sheet 2

INVENTOR.
FREDERICK R. HICKERSON
BY Arthur L. Collins
ATTORNEY 3,150,485
VARIABLE THRUST ROCKET ENGINE
Frederick R. Hickerson, Newton, N.J., assignor to the United States of America as represented by the Secretary of the Navy
Filed Nov. 24, 1961, Ser. No. 154,910
2 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft liquid bi-propellant reaction engines having a wide throttling range and capable of using either hypergolic or non-hypergolic propellants.

In liquid bi-propellant reaction engines fuel and oxidizer materials are sprayed into a chamber and combusted. The reaction of the exhausting combusted gases provides a forward thrust.

Using hypergolic materials, like nitric acid and ammonia, engine starting is obtained by using an additive, lithium, in the propellants. However, with non-hypergolic propellants, for instance, hydrogen peroxide and JP-5, an igniter is required for decomposing the hydrogen peroxide. Previously, the engines required decomposition of the entire oxidizer (hydrogen peroxide) flow, followed by liquid injection of the fuel (JP-5).

This requirement caused the engines to be excessively heavy and complex as a result of the installation of the additional equipment, like the large catalyst beds needed to handle the high oxidizer flow rates to the engine. Furthermore, the catalyst beds were vulnerable to trace contaminants from the hydrogen peroxide which caused excessively high bed-pressure drop, and resulted in a combustion chamber drop with a reduction in engine thrust.

Throttling of the engine has been achieved in various ways. For instance, by varying the pressure at which the propellants are injected into the combustor chamber, or by reducing the number of injector orifices through which the propellants are fed into the combustor. However, combustion chamber pressure is affected with such throttling devices and engine performance is poor, especially at low altitudes.

One general object of this invention is to improve liquid bi-propellant reaction engines.

More specifically, objects of this invention are to provide a reaction engine which includes a throttling assembly for simultaneously varying the propellant and exhaust areas, so that the combustion chamber is constant for all degrees of throttling; which has a simplified propellant injection system for complete control of their introduction; which is furnished with an igniter for use of hypergolic or non-hypergolic propellants and by which only a portion of the oxidizer need be decomposed; in which starting may be accomplished though the engine is fully throttled; and in which there is a minimum of complex moving parts.

In an engine illustrative of one embodiment of this invention, briefly, the oxidizer and fuel propellants are introduced through stationary orifices. A movable shuttle is mounted for covering the orifices and is coupled to a pintle for reducing the exhaust throat area, so that, in throttling, both the propellant injection and exhaust throat areas are affected. Igniters are incorporated in the shuttle and a portion of the oxidizer is directed through them whereby a sufficient combustion chamber pressure is created, by the oxidizer which is decomposed by the igniter, to move the throttling assembly to full open and starting of the engine.

Figure 2:
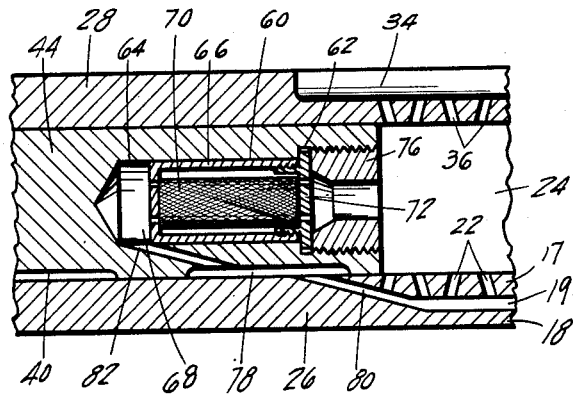
Figure 3:
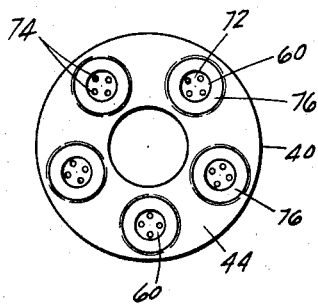
Figure 4:
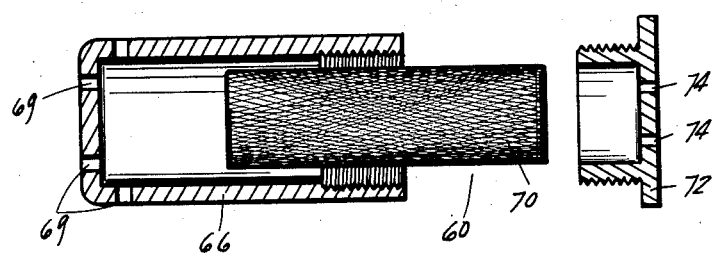

In the drawings:
FIG. 1 is a longitudinal sectional view of a reaction engine incorporating the invention showing the throttling assembly fully open in solid lines and its position at full throttle in broken lines;
FIG. 2 is an enlarged view of a portion of the engine showing details of an igniter installed in the shuttle;
FIG. 3 is an end view of the shuttle; and
FIG. 4 is an exploded view of an igniter.

Referring to the drawing, the engine is shown to include a fixed housing 10 and a throttling assembly 40. The housing 10 is a double-walled cylindrical shell defining within it a combustion chamber 12. It tapers inwardly at a rearward or exhaust section to form a constricted throat 14. Rearward of the throat 14 the housing gradually expands into a diverging nozzle 16 from which the engine's combusted gases are ejected.

The walls 17 and 18 forming the housing 10 are concentrically spaced, by a spiral web (not shown), defining a cooling chamber 19 for the passage of the oxidizer propellant. Oxidizer material passing through chamber 19 cools the housing and is itself preheated. A connector 13 is provided for connecting chamber 19 with an unshown source of oxidizer.

At its forward end, housing 10 tapers inwardly and projects forwardly as a cylinder or igniter housing 20. A plurality of orifices 22 penetrate the inner wall 17 and provide outlets from oxidizer chamber 19 to an injector area or chamber 24. Orifices 22 are arranged in spaced annular rows and the orifices in adjacent rows are directed at an angle from the perpendicular of the thrust axis toward each other to cause an impingement in the flow stream.

A support casing 26 is secured as a forward extension of igniter housing 20 which is capped at the forward end with an end sleeve 28. The latter element is a small diameter tube with an outwardly extending flange 30 by which bolts 32 attach it to the end of casing 26. The tubular portion of sleeve 28 is concentrically spaced from casing 26 and extends rearward and into injector chamber 24. An annular groove 34, at the rearward portion on the inner peripheral wall of sleeve 28, forms a fuel well which is in communication with injection chamber 24 by fuel orifices 36. The arrangement of the fuel orifices is similar to the oxidizer orifices 22, previously described, and concentrically opposed to them.

Throttle assembly 40 is supported by casing 26 and sleeve 28. It includes a tubular pintle 42, and an injector governing shuttle 44 and pins 46 which tie them together. Pintle 42 is supportably mounted for sliding axial movement in the central cavity of sleeve 28. It extends, from a point forward of casing 26, through combustor chamber 12 and terminates in a bulbous end 38 on the forward side of throat 14. The bulbous end 38 is adapted to enter the throat and reduce its area to impede gas flow therethrough. A central passage 48 in pintle 42 is adapted to be connected to a source of fuel, not shown, and runs substantially to the pintle's rearward end where it joins a concentric passage 50. The latter passage extends forwardly and dead ends in the forward portion of the pintle. Transverse outlets 52 connect passage 50 to fuel well 34 in sleeve 28. The pintle, besides having the throat reducing function during throttling, thus serves as a conduit for one of the propellants (fuel) to combustor chamber 12 by way of injector chamber 24. Fuel flow through the pintle cools the pintle and is itself preheated.

Shuttle 44 of the throttling assembly, an annular piston, is disposed in the space between end sleeve 28 and support casing 26. Its axial position governs the number of fuel and oxidizer orifices, 36 and 22, that are open for admission of propellants into injector chamber 24, and it, therefore, is a propellant throttle. Axial movement of the shuttle in a rearward direction covers the propellant orifices, 36 and 22; whereas, forward movement achieves an opposite result.

Shuttle 44 is joined to pintle 42, for simultaneous movement of both, by pins 46, only one shown (FIG. 1). These pass through an axial slot 54 in the sleeve 28. Holes 56 in support casing 26 furnish an entry for the pin's insertion and removal and also act as vents for any fluid leakage around shuttle 44. Annular groove 58 on the outer periphery of shuttle 54 collects fluid leakage which then drains through vents 56.

Shuttle 44 is moved axially rearward, and pintle 42 therewith, by the pressure of fluid introduced at its forward end from an unshown source through an aperture 59 in flange 30 of sleeve 28. No provision is made for forward movement, or the return of the shuttle, since this is effected by the pressure in combustor chamber 12.

In order to ignite non-hypergolic propellants, such as oxygen and kerosene or $H_2O_2$ and JP-5, shuttle 44 carries a number of igniters 60. For this purpose, the shuttle's rearward end face has a plurality of equally spaced, circumferentially arranged, and axially directed bores 62 (FIG. 2), each having a coaxial counterbore 64 (FIG. 2) of smaller diameter.

Igniter 60 has a cylindrical body 66, FIG. 3, closed at its forward end, which inserts into counterbore 64. A removable catalyst bed, 70, in the form of a coiled silver screen, fills the body 66 and is accessible to propellants through apertures 69 in the forward end of the igniter body. The rearward end of the igniter body is closed with a removable flanged closure 72 and has apertures 74 through which a decomposed propellant may leave the igniter.

Igniter 60 fits into counterbore 64 only a sufficient distance to leave a space, 68, at its forward end. The flange on closure 72 seats on the shoulder between bore 62 and counterbore 64 and is engaged by a ring nut 76 which threads into bore 62 for securing the igniter into position.

For the admission of the oxidizer propellant to igniters 60 from the oxidizer chamber 19 in housing 10 there is an annular groove or manifold 78 in the outer surface of shuttle 44 which is connected to oxidizer chamber 19 by a number of passageways 80 in support casing 26, and connecting passageways 82 in shuttle 44 which lead from the manifold to the spaces 68 in the counterbores 64. The manifold and passageways, 80 and 82, are dimensioned and slanted so that the propellant can enter the igniters from the oxidizer chamber 19 regardless of the shuttle's position. Furthermore, the passageways are designed so that only about ten percent of the material in chamber 19 passes through the igniters; the rest of the material is injected in raw form into the injector chamber 24 through the orifices 22.

The igniters decompose only about ten percent of the oxidizer used by the engines. Besides avoiding the contamination referred to in the forepart of the description, by decomposing only this small quantity of oxidizer, the effects on engine thrust through drop in the catalyst bed pressure becomes minor. The effect on the engine does not exceed one tenth that when the entire oxidizer flow is decomposed. For instance, a twenty percent drop-off in engine thrust caused by contamination of igniters handling the oxidizer flow, would mean only about a two percent thrust drop-off in an engine using the device herein described.

In operation of the engine, with the throttle fully open, as shown by the position of shuttle 44 in solid lines in FIG. 1, the oxidizer and fuel orifices, 22 and 36, are uncovered. The oxidizer and fuel propellants, after coursing through the housing 10 and pintle 42, respectively, are sprayed into injector chamber 24 through orifices 22 and 36. A portion of the oxidizer passes through the igniters 60 by way of the passageways, 80 and 82, and manifold 78 and is decomposed so as to cause starting of the engine.

To throttle the engine, pressurized fluid is admitted through aperture 59 in end sleeve 28. Shuttle 44, and pintle 42 thereby, is forced rearward, whereby some of the oxidizer and fuel orifices, 22 and 36, are covered by it. The quantity of the propellants injected into the engine is decreased by this movement of the shuttle, and, likewise, the area of throat 14 is reduced because the rearward end of pintle 42 is moved into it, as shown by the broken lines in FIG. 1. This joint movement of the shuttle and pintle causes an engine thrust fall off without any change in the combustor chamber pressure.

When the engine is fully throttled the shuttle 44 and pintle 42 are in the position shown by the broken lines in FIG. 1. In this position the oxidizer and fuel orifices, 22 and 36, are covered by the shuttle; however, the oxidizer has access to the combustor chamber through the igniters 60.

In actual practice, with an engine fully throttled, the flow of oxidizer through the igniters 60 produced a combustor chamber pressure of about one-fifth the normal pressure of the combustor chamber. This was sufficient to move the shuttle and pintle forward to uncover the injection orifices 22 and 36 and for the engine to start. No problems in starting were encountered.

Although only one embodiment of the invention has been shown and described, obviously various modifications are possible in the light of the above teaching. It is therefore to be understood that within the scope of the appended claims the invention may be practiced otherwise than as described.

What is claimed is:

1. A liquid bi-propellant variable thrust reaction engine comprising an open ended housing enclosing an injector area, a combustor chamber, and an exhaust throat, said housing having a plurality of axially spaced oxidizer orifices adjacent said injector area for introducing an oxidizer therein, a sleeve having a flange secured by said flange to the forward end of said housing and concentrically extending into said injector area, said sleeve having an axial cavity therethrough, an elongated pintle slideably mounted in said cavity having a bulbous end for varying the size of said throat, said sleeve having a plurality of axially spaced fuel orifices for introducing a fuel into said injector area, an axially slideable annular shuttle mounted on said sleeve for covering said oxidizer and fuel orifices, said shuttle having a plurality of circumferentially spaced and axially extending bores opening into said injector area, an igniter having a catalyst bed mounted in each of said bores, oxidizer conduit means connected for the passage of an oxidizer to said oxidizer orifices and a portion through said igniter into said injector area, fuel conduit means connected for the passage of a fuel to said fuel orifices, means for movement of said shuttle including a passage through said sleeve for the application of fluid pressure to the forward end of said shuttle, and means connecting said shuttle to said pintle for simultaneous movement therewith.

2. The engine of claim 1 wherein said means connecting said shuttle to said pintle includes an axially extending slot through said sleeve and a radially extending pin passing through said slot secured to said shuttle and said pintle.

References Cited in the file of this patent
UNITED STATES PATENTS

| | | |
|---|---|---|
| 2,637,973 | Lawrence | May 12, 1953 |
| 2,780,914 | Ring | Feb. 12, 1957 |
| 2,810,259 | Burdett | Oct. 22, 1957 |
| 2,870,603 | Long | Jan. 27, 1959 |
| 2,897,649 | Reddy | Aug. 4, 1959 |
| 2,939,281 | Conyers | June 7, 1960 |
| 2,954,670 | Helus | Oct. 4, 1960 |
| 2,972,227 | Allen | Feb. 21, 1961 |